United States Patent [19]

Moji et al.

[11] Patent Number: 4,716,067
[45] Date of Patent: Dec. 29, 1987

[54] HONEYCOMB CORE STRUCTURE WITH EMBEDDED FASTENER

[75] Inventors: Yukimori Moji, Seattle; Richard Q. Taylor, Tukwila, both of Wash.

[73] Assignee: The Boeing Company, Seattle, Wash.

[21] Appl. No.: 906,209

[22] Filed: Sep. 12, 1986

[51] Int. Cl.$^4$ ............................................. B32B 3/12
[52] U.S. Cl. .................................... 428/117; 156/292
[58] Field of Search ..................... 428/116, 117, 472; 156/292; 204/38.3, 56.1

[56] References Cited

U.S. PATENT DOCUMENTS

| | | | |
|---|---|---|---|
| 3,932,249 | 1/1976 | Jury et al. | 428/116 X |
| 3,959,091 | 5/1976 | Moji et al. | 428/472 X |
| 3,989,876 | 11/1976 | Moji et al. | 428/472 |
| 4,025,681 | 5/1977 | Donnelly et al. | 428/116 |
| 4,063,981 | 12/1977 | Rhodes et al. | 428/116 X |
| 4,265,688 | 5/1981 | Gorski | 428/117 X |
| 4,284,443 | 8/1981 | Hilton | 428/116 X |
| 4,357,013 | 11/1982 | Fernandez et al. | 428/116 X |
| 4,370,372 | 1/1983 | Higgins et al. | 428/116 |
| 4,411,380 | 10/1983 | McWithey et al. | 428/116 X |
| 4,473,446 | 9/1984 | Locke et al. | 428/472 X |
| 4,567,076 | 1/1986 | Therrien | 428/116 X |

*Primary Examiner*—Henry F. Epstein
*Attorney, Agent, or Firm*—Christensen, O'Connor, Johnson & Kindness

[57] ABSTRACT

A method of fabricating a honeycomb core sandwich structure with an embedded fastener and the resulting structure are disclosed. The method comprises laying down a first nonmetallic synthetic layer (11), preferably a graphite epoxy layer, which may be cured or uncured. Bonded to the first nonmetallic synthetic layer is a honeycomb core layer (15) into which one or more flush head fasteners (25) have been inserted. The flush head fasteners are inserted into holes (13) in the honeycomb core that have an indentation (19) at one end that is configured to mate with the underside (21) of the head (23) of a flush head fastener (25). Bonding is accomplished by priming the walls of the honeycomb core layer adjacent the surfaces of the layer, and the fastener, with a suitable primer, preferably before the fastener is installed, and, coating one of the surfaces of the first nonmetallic synthetic layer (11) with a suitable adhesive before joining the first nonmetallic synthetic layer (11) to the surface of the honeycomb core layer (15) containing the head (23) of the flush head fastener (25). Thereafter, the cells of the honeycomb core that surround the fastener are filled with a potting material (35). Then, a second nonmetallic synthetic layer (37) is bonded to the surface of the honeycomb core remote from the surface to which the first nonmetallic synthetic layer (11) is bonded.

42 Claims, 2 Drawing Figures

HONEYCOMB CORE STRUCTURE WITH EMBEDDED FASTENER

TECHNICAL AREA

This invention relates to fastener installations and, more particularly, to fastener installations in honeycomb core structures.

BACKGROUND OF THE INVENTION

While the present invention was developed for use in aircraft, and is described in an aircraft environment, it is to be understood that the invention can be utilized to create honeycomb core structures with embedded fasteners for use in other environments.

In recent years, more and more attention has been directed to creating new and better aircraft parts from various types of high-strength, lightweight materials that were not previously used in aircraft. The materials range from new metal alloys, such as new titanium and aluminum-lithium allosy, to a variety of synthetic materials, such as graphite/epoxy composites. The parts range from structural components, such as stringers, frame elements and gussets, to aerodynamic elements, such as ailerons, trim tabs and landing gear doors. In some instances, proposals have been made to create parts by joining together pieces made of different materials. One such proposal is to create parts formed of sandwich structures comprising honeycomb core layers and skin layers bonded together, the skin layers being formed of nonmetallic synthetic materials, such as graphite/epoxy composites. One difficulty associated with such structures, which are herein referred to generically as synthetic skin/honeycomb core structures, has been installing fasteners in a manner that results in the fasteners having adequate load carrying capability, In the past, fasteners have been installed in synthetic skin/honeycomb core structures by drilling a hole in the structures after they have been formed and installing truss head fasteners in the holes. The large underside surface of truss head fasteners distributes head force over a relatively large area of the synthetic skin.

While truss head fasteners have adequate load capability, they have a number of disadvantages when used with synthetic skin/honeycomb core structures. Specifically, because truss head fasteners create pimple-like protrusions of the surface of the skin against which the heads impinge, the skin surface is not aerodynamically smooth. As a result, such skin surfaces are less than ideal for parts used to form the wings, fuselage and empennage of an aircraft, such as ailerons, tabs, landing gear doors, etc. Further, because most fasteners are formed of metal, which is electrically conductive, truss head fasteners provide an electrical conducting path between the nonmetallic surface against which the truss head fasteners impinge and internal metallic components. This is particularly undesirable when the part is an external part, such as a tab, aileron or landing gear door, because the truss head fastener provides an electrical conducting path for lightening striking the part. Further, because truss head fasteners require a hole through the skin layers of synthetic skin/honeycomb core parts, they create potential moisture paths, particularly when fasteners loosen, which can cause corrosion of the core, if the core is formed of a material that is subject to corrosion.

The invention is directed to providing a method of embedding a fastener in synthetic skin/honeycomb core structures that avoids the foregoing disadvantages. More specifically, the invention is directed to providing a method of embedding a fastener in a synthetic skin/honeycomb core structure that has adequate load carrying capability and leaves the other surface of at least one skin unbroken and aerodynamically smooth.

SUMMARY OF THE INVENTION

In accordance with this invention, a method of fabricating a synthetic skin/honeycomb core structure with an embedded fastener and the resulting products are provided. The method comprises the steps of: (a) laying down a first nonmetallic synthetic layer; (b) forming at least one hole through a honeycomb core layer, said hole having an indentation on one end that conforms to the shape of the underside of the head of a flush head fastener, the depth of said indentation being such that when a flush head fastener having a head with an underside that is sized and shaped to conform to said indentation and a flat exterior side is installed in said hole, the flat exterior side of the head of said fastener lies substantially flush with the surrounding surface of said honeycomb core layer; (c) inserting a flush head fastener having a head with an underside that is sized and shaped to conform to said indentation and a flat exterior side into said hole such that the flat exterior side of the hed of said fastener lies substantially flush with the surrounding surface of said honeycomb core layer; (d) bonding the flat exterior side of the head of said fastener and the flush surrounding surface of said honeycomb core layer to one surface of said first nonmetallic synthetic layer; (e) potting the cells of said honeycomb core layer surrounding said hole; and, (f) bonding a second nonmetallic synthetic layer to the surface of said honeycomb core layer remote from the surface of said honeycomb core layer bonded to said one surface of said first nonmetallic synthetic layer.

A honeycomb core sandwich structure with an embedded fastener formed in accordance with the invention comprises: (a) a honeycomb core layer; (b) at least one fastener embedded in said honeycomb core layer, said at least one fastener having a shank and an enlarged head with a flat exterior surface, said fastener embedded in said honeycomb core layer such that the flat exterior surface of said head lies coplanar with one surface of said honeycomb core and the shank of said fastener lies transverse to the plane of said honeycomb core layer; (c) potting material located in the cells of said honeycomb core layer that surround said at least one fastener; (d) a first nonmetallic synthetic layer bonded to both the surface of said honeycomb core layer that is coplanar with the flat exterior surface of the head of said at least one fastener and the flat exterior surface of the head of said at least one fastener; and, (e) a second nonmetallic synthetic layer bonded to the surface of said honeycomb core layer remote from the surface to which said first nonmetallic synthetic layer is bonded.

In accordance with other aspects of this invention, preferably, the nonmetallic synthetic layers are chosen from the group consisting of graphite/epoxy composites, graphite/polyimide composites, polybenzimidazole, polybenzoxazole, thermoplastic polyimides, polyphenylene sulfide and polyimides.

In accordance with further aspects of this invention, the honeycomb core may be formed of either metallic or nonmetallic materials. If metallic, preferably, the honeycomb core material is chosen from the group consisting of titanium, aluminium and nickel-copper alloys. If nonmetallic, preferably, the honeycomb core material is chosen from the group consisting of glass fiber reinforced phenolics, bias woven glass fiber reinforced phenolics, nomex and polyimides.

In accordance with further aspects of this invention, the fastener may be formed of either metallic or nonmetallic materials. If metallic, preferably, the fastener material is chosen from the group consisting of titanium, aluminum and corrosion resistant steel alloys. If nonmetallic, preferably, the fastener material is a carbon fiber/epoxy composite.

In accordance with still other aspects of this invention, the presently most preferred form of the invention is a titanium alloy honeycomb core in combination with a titanium alloy fastener bonded to graphite/epoxy composite skin layers.

As will be readily appreciated from the foregoing summary, the invention provides a synthetic skin/honeycomb core structure with an embedded fastener that overcomes the disadvantages of prior art structures. Because the fastener head is entirely covered by the first nonmetallic synthetic layer, and because the exterior surface of the head of the fastener lies coplanar with the surrounding surface of the honeycomb core material, the outer surface of the first nonmetallic synthetic layer is aerodynamically smooth. Further, because the first nonmetallic synthetic layer is not penetrated, no electrical or moisture conducting paths through the structure are created by the fastener. Even though the head of the fastener does not press against the outer surface of the first nonmetallic synthetic layer, high fastener load capability is provided because the flat exterior surface of the head of the fastener is bonded to the inner surface of the first nonmetallic synthetic layer.

BRIEF DESCRIPTION OF THE DRAWINGS

The foregoing and other advantages and features of this invention will become better appreciated as the same becomes better understood by reference to the following detailed description when taken in conjunction with the accompanying drawings wherein.

DESCRIPTION OF THE PREFERRED EMBODIMENT

Figure 1:
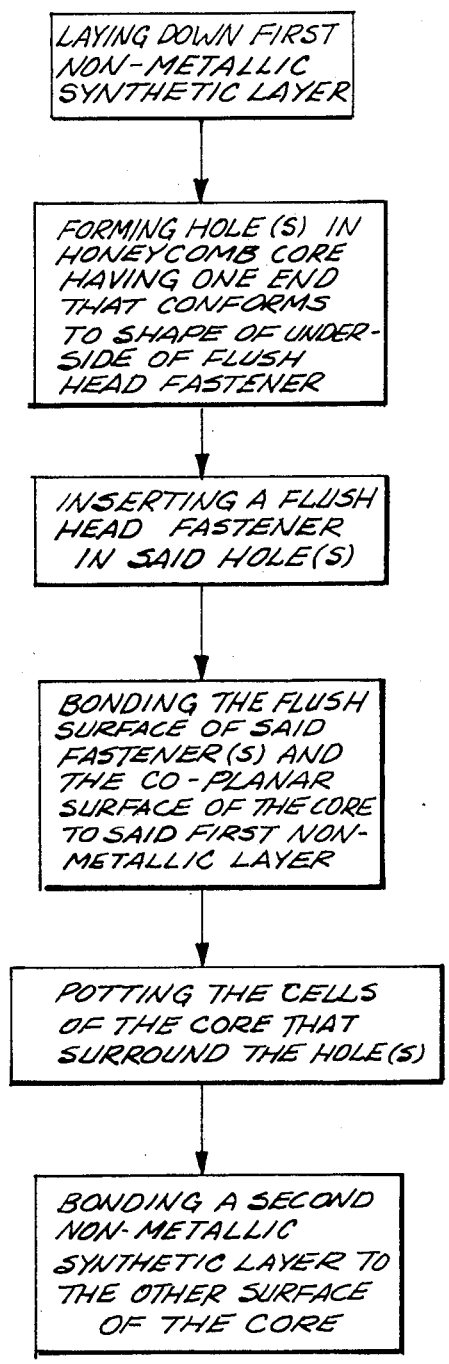
FIG. 1 is a flow diagram illustrating the major steps of the method of the invention; and, FIG. 2 is a cross-sectional view of a synthetic skin/honeycomb core structure with an embedded fastener formed in accordance with the invention.
Figure 2:
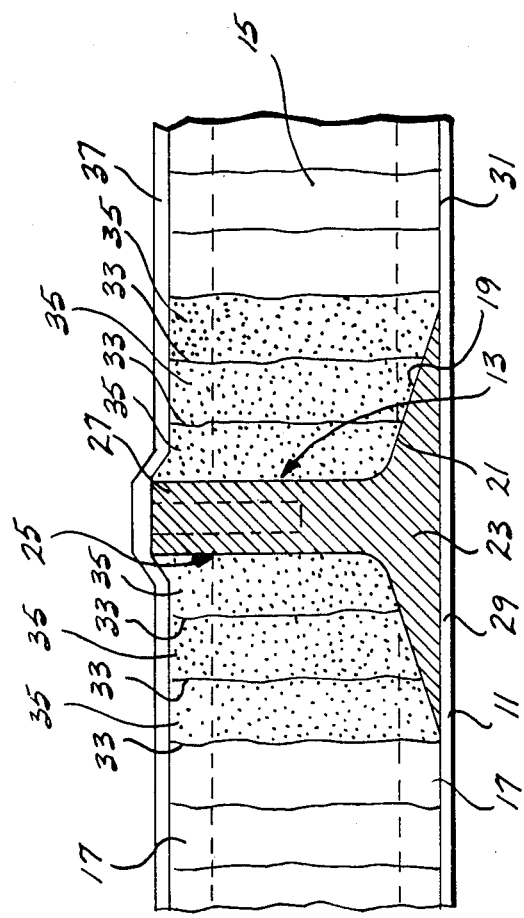

The present invention is directed to a method of forming a synthetic skin/honeycomb core structure with an embedded fastener and the resulting structures. FIG. 1 is a flow diagram illustrating, broadly, the preferred sequence of steps of the method of the invention and FIG. 2 is a cross-sectional view illustrating the preferred form of a synthetic skin/honeycomb core structure with an embedded fastener formed in accordance with the method of the invention.

The first step of the invention comprises laying down a first nonmetallic synthetic layer 11. The first nonmetallic synthetic layer is layed down on a suitable work surface, commonly referred to as a tool in the aerospace industry. While the preferred nonmetallic synthetic layer is a graphite/epoxy composite, as will be better understood from the following description, various nonmetallic synthetic materials can be used to form the first layer. If a graphite/epoxy composite material is utilized, the first layer can be cured after being layed down, or left uncured. Suitable graphite/epoxy composite materials are: (a) Rigidite 5208T-300-35, available from Normco Materials, Inc., Anaheim, Calif. 92806; (b) Hye-1034-II, available from Fiberite Corporation, Winona, Minn. 55987; and, (c) W3T-282-42-F263-2, available from Hexcel Structural Product, Livermore, Calif. 94550.

Prior to, simultaneously with or subsequent to laying down the first nonmetallic synthetic layer, a honeycomb core layer 15 is treated prior to receiving fastener holes 13. In our actual embodiment of the invention, the chosen honeycomb core was formed of aircraft grade welded titanium obtained from Rohr Industries, Inc., Riverside, Calif. 92503. The titanium honeycomb core was cleaned, pickled and anodized. The cleaning was accomplised by immersing the core in Iso-Prep 44 for 15 minutes and, then, rinsing the core for 5 minutes with hot water. Iso-Prep 44 is an alkaline cleaner available from Allied-Kelite Products Division of The Richardson Co., Des Plaines, Ill. 60018. Pickling was accomplished by immersing the clean core in a nitric-hydrofluoric bath for 90 seconds and, then, cold water rinsing the core for 5 minutes. The cleaned and pickled core was anodized by placing the core in a chromic-hydrofluoric bath of $4.0\pm0.5$ volts and 0.75 amp/ft$^2$ for 20 minutes and, then, rinsing with cold water for 5 minutes and drying at 140° F. See U.S. Pat. No. 4,473,446, entitled "Chromic Acid-Fluoride Anodizing Surface Treatment For Titanium."

After the honeycomb core layer 15 is treated, if required, the core walls 17 adjacent to the surfaces of the core are covered with a suitable primer. In the case of a titanium honeycomb core layer, a suitable primer is a nitril phenolic adhesive, such as the EC 1660, available from Minnesota Mining and Manufacturing Co., St. Paul, Minn. 55101. Excess EC 1660 primer can be removed by placing the core on Kraft paper, while the primer is first dried at room temperature for 30 minutes followed by baking the core layer at 200° F. for 30 minutes.

After the honeycomb core layer is primed to a suitable depth (e.g., ¼ inch), fastener holes that conform to the shape of the fastener to be installed are created in the honeycomb core layer 15. In the case of a titanium honeycomb core layer hole creation can be accomplished by crushing the core layer 15 to create fastener holes.

As illustrated in FIG. 2, the holes 13 are formed such that one end of each hole includes an indentation 19 that conforms to the underside 21 of the head 23 of flush head fastener 25. While the configuration of the indentation 19 of the hole 13 and the underside 21 of the head 23 can vary, preferably, the indentation 19 and the underside 21 are conically shaped. The depth of the indentation 19 is such that when the shank 27 of the flush head fastener 25 is positioned in the hole 13 such that the head 23 fully fills the region defined by the indentation 19, the exterior surface 29 of the flush head fastener 25 is coplanar with the adjacent surface 31 of the honeycomb core layer 15.

The fastener used in the actual embodiment of the invention, referred to above, was formed of titanium. Prior to installation, the fastener was sandblasted to remove a previously applied coating. Obviously, cleaning would have been unnecessary if the fasteners had been clean and uncoated. Thereafter, the fastener was treated, i.e., cleaned, pickled and anodized in the same way the titanium core layer was treated. As shown in FIG. 2, the fastener should have a large diameter head when compared to the diameter of the shank of the fastener. A fastener having a head to shank diameter ratio of 3:1 was used in the actual embodiment of the invention referred to above.

After the fastener is treated, it is primed. In the case of a titanium fastener, priming can be accomplished by dipping the fastener in a nitril phenolic adhesive, such as the EC 1660 available from Minnesota Mining and Manufacturing Co., St. Paul, Minn. 55101. Like the core layer, excess EC 1660 primer is removed by placing the fastener on Kraft paper while the primer dries at room temperature for 30 minutes and, then, baked at 200° F. for 30 minutes.

After the primer is cured, the flush head fasteners 25 are installed in each hole 13. Then, the first nonmetallic synthetic layer is coated with a suitable bonding adhesive, such as the FM 300 composite bonding adhesive available from the Bloomingdale Dept., American Cyanamide Company, Havre de Grace, Md. 21078. Next, the honeycomb core layer 15 and the fasteners 25 are placed fastener head down on the first nonmetallic synthetic layer 11 previously layed on a suitable tool or work surface. Thereafter, the cells 33 surrounding the hole 13 are filled with a potting material 35. Any suitable potting material can be utilized, such as the FM410-1 structural forming adhesive available from by American Cyanamide Company, Havre de Grace, Md. 21078; Epocast 33-A/9216, honeycomb edge filling and potting compound, available from Furane Product Company, Los Angeles, Calif. 90039; and the EA 934 room temperature curing two part epoxy adhesive, available from the Hysol Division of Dexter Corporation, Los Angeles, Calif. 90039.

After the cells 33 adjacent to the hole 13 are filled with a suitable potting compound, a bonding adhesive, such as the FM 300 adhesive for composite bonding, available from the Bloomingdale Department of American Cyanamide Company, Havre de Grace, Md., is applied to the upper surface of the honeycomb core 15. Then a second nonmetallic synthetic layer 37 is applied to the exposed surface of the honeycomb core 15 and the tip of the shank 27 of the fasteners 25. Preferably, the tip of the shank 27 is coated with a release agent prior to applying the second nonmetallic synthetic layer 37 so that the overlying portion of the second nonmetallic synthetic layer can be removed after the layer is cured. Preferably, like the first nonmetallic synthetic layer, the second nonmetallic synthetic layer is formed of a graphite/epoxy composite that is layed down atop the upper surface of the honeycomb core layer 15 in a conventional manner.

In summary, as generally shown in FIG. 1, the method of the invention comprises laying down a first layer formed of a nonmetallic synthetic material and coating the upper surface of the layer with a suitable bonding adhesive. Then, a honeycomb core layer is prepared by cleaning the layer and applying a primary adhesive to the regions of the walls of the honeycomb core adjacent the outer surface of the honeycomb core. Next, fastener holes having a fastener conforming indentation on one end are formed in the honeycomb core layer and suitably configured fasteners are mounted in the holes. The fasteners are configured such that the outer surface of the fastener heads lie coplanar with one surface of the honeycomb core. Prior to installation, the fasteners are cleaned and primed. After the fasteners are installed, the fasteners and the honeycomb core layer are bonded to the first nonmetallic synthetic layer. Then, the honeycomb core cells that surround the fastener are filled with a suitable potting compound and the exposed surface of the honeycomb core is coated with a bonding adhesive. Next, the exposed surface is overlayed with a second nonmetallic synthetic layer. After the foregoing structure is formed, it is heated in an autoclave to cure the various adhesives, including uncured adhesives (e.g., epoxy) used to form the first and second nonmetallic synthetic layers. In this regard, the first nonmetallic synthetic layer may be cured prior to the other components being assembled on its upper surface or remain uncured during assembly. If uncured, the first nonmetallic synthetic layer is cured along with the second nonmetallic synthetic layer and the other materials that cure at elevated temperatures, e.g., the bonding adhesives.

While, as noted above, the presently preferred skin material is a graphite/epoxy composite, various other co-curing materials can be used to form the first and second nonmetallic synthetic layers 11 and 37. Suitable materials include graphite polyimide composites such as the PMR-15A/Celion 6000 or PMR-15B/Celion 3000 series of materials available from Hitco Material Division of U.S. Polymeric, Santa Ana, Calif. Other suitable skin materials are polybenzimidazole (PBI), polybenzoxazole (PBO), thermoplastic polyimides (such as LARC-TPI, a NASA developed polymer), and polyphenylene sulfide (PPS). LARC-TPI is available from Mitui Toatsu, Tokyo, Japan. PPS, which is a chemical resistant, semi-crystalline, linear thermoplastic, is available from Phillips Chemical Co., Bartlesville, Okla.

In addition to titanium honeycomb core layers, nonmetallic as well as metallic honeycomb cores can be utilized in carrying out the method of the invention. Suitable aluminum honeycomb cores are the Hexcel CR/Al 5052, available from Hexcel Corporation, Dublin, Calif. 94566, and the Drua-Core, available from the Bloomingdale Plant of American Cyanamide Company, Havre de Grace, Md. 21078. A suitable nickel and copper honeycomb core is as the Nickel 201 alloy and Olin alloy 124 copper honeycomb core, available from Rohr Industries, Inc., Riverside, Calif. 92503. A suitable nonmetallic honeycomb core is the HRP (glass fabric reinforced phenolic) honeycomb core, available from Hexcel Corporation, Casa Grande, Ariz. 85222. Another suitable nonmetallic honeycomb core is the HFT (bias woven glass fabric reinforced phenolic) honeycomb core also available from Hexcel Corporation, Casa Grande, Ariz. 85222. A further example of a suitable nonmetallic honeycomb core is the HRH (Nomex) honeycomb core, available from Hexcel S.A., Welkenraedt, Belgium. A final example of a suitable nonmetallic honeycomb core is the HRH-327E (polimide) honeycomb core available from the Hexcel Corporation, Dublin, Calif. 94566.

In addition to titanium fasteners, other fasteners, such as aluminium fasteners, corrosion resistant steel fasteners (e.g., fasteners formed of 15-5 pH, 17-4 pH steel), and carbon fiber epoxy fasteners, can be utilized in embodiments of the invention.

As noted above, the presently preferred surface preparation procedure for use with titanium cores is anodizing the surface to form a porous adhesion-promoting oxide coating. The preferred way of forming such a coating is described in U.S. Pat. No. 4,473,446, entitled "Chromic Acid-Fluoride Anodizing Surface Treatment for Titanium," referenced above. Other metal cores should be treated in the manner appropriate for the metal. For example, an aluminum core may be anodized with phosphoric acid in accordance with the method described in U.S. Pat. No. 4,025,681, entitled "Environmentally Durable Metal Honeycomb Structure"; a copper core may be treated with a red and black oxide or brass treatment in accordance with the Gould process practiced by Norplex Co., La Crosse, Wis. 54601; and, nickel core may be zinc-nickel plated by a process developed by The Boeing Company, Seattle, Wash., which is described in U.S. patent application Ser. No. 628,594, filed July 6, 1984 by G. F. Hsu et al., and entitled "Zinc-Nickel Electroplated Article And Method for Producing The Same."

As also noted above, preferably, the surface of a titanium metal fastener is prepared using a chromic acid-fluoride anodizing surface treatment of the type described in U.S. Pat. No. 4,473,446. Alternatively, titanium fasteners can be treated in accordance with the process described in U.S. Pat. Nos. 3,959,091 or 3,989,876 to create a porous, adhesion-promoting oxide coating. Like aluminum honeycomb cores, aluminum fasteners can be treated with phosphoric acid in the manner described in U.S. Pat. No. 4,085,012. A suitable treatment for steel fasteners is immersion in a sulfuric acid or sulfuric acid chromic acid mixture in accordance with the process described in U.S. Pat. No. 4,064,020.

As noted above, one suitable primer/bonding adhesive combination is the EC 1660 (Minnesota Mining and Manufacturing Co., St. Paul, Minn. 55101) and the FM 300 (Bloomingdale Plant, American Cyanamide, Havre de Grace, Md. 21078). Other suitable primers for use with the FM 300 bonding adhesive are the EC 3917 (Minnesota Mining and Manufacturing Company) and the BR 127 (Bloomingdale Plant, American Cyanamide). Other suitable combinations are the EC 3917 primer with an AF 191 bonding adhesive, both available from Minnesota Mining and Manufacturing Company, St. Paul, Minn. 55101. A further combination is the EA 9205 primer and EA 9649 bonding adhesive, both available from the Hysol Division, Dexter Corporation, Los Angeles, Calif. 90039.

Finally, in addition to the Epocast 33-A/9216 potting compound, available from Furane Product Company, Los Angels, Calif., other suitable potting compounds are the AF 3024 (Minnesota Mining and Manufacturing Company, St. Paul, Minn. 55101), FM 410-1 (Bloomingdale, Plant, American Cyanamide, Havre de Grace, Md. 21078) and the EA 934 (Hysol Division, Dexter Corporation, Los Angeles, Calif. 90039).

In summary, in accordance with this invention, synthetic skin/honeycomb core structures with embedded fasteners are provided. The method of the invention comprises several steps including: laying down of a first nonmetallic synthetic layer; forming of at least one hole through a honeycomb core layer; inserting a flush head fastener into the hole in the honeycomb core layer; bonding the flush side of the head of the fastener and the coplanar surface of the honeycomb core layer to the first nonmetallic synthetic layer; potting the cells of the honeycomb core layer that surround the fastener; and, bonding a second nonmetallic synthetic layer to the other surface of the honeycomb core layer. While some of these steps must be practiced in the sequence described, obviously some steps can be practiced in different sequences. For example, holes can be formed in the honeycomb core layer prior to laying down the first nonmetallic synthetic layer. Or, the holes can be formed in the honeycomb core layer and the flush head fasteners inserted prior to laying down the first nonmetallic synthetic layer. Further, various of the surface preparation, cleaning and priming steps can be performed in a variety of ways. Consequently, the invention can be practiced otherwise than as specifically described herein.

The embodiments of the invention in which an exclusive property or privilege is claimed are defined as follows:

1. A method for fabricating a synthetic skin/honeycomb core sandwich structure with an embedded fastener, said method comprising the steps of:
   laying down a first nonmetallic synthetic layer;
   forming at least one hole through a honeycomb core layer, said hole having an indentation on one end that conforms to the shape of the underside of the head of a flush head fastener, the depth of said indentation being such that when a flush head fastener having a head with an underside side that is sized and shaped to conform to said identation and a flat exterior side is installed in said hole, the flat exterior side of the head of said fastener lies substantially flush with the surrounding surface of said honeycomb core layer;
   inserting a flush head fastener having a head with an underside that is sized and shaped to conform to said indentation and a flat exterior side into said hole such that the flat exterior side of the head of said fastener lies substantially flush with the surrounding surface of said honeycomb core layer;
   bonding the flat exterior side of the head of said fastener and the coplanar surface of said honeycomb core layer to one surface of said first nonmetallic synthetic layer;
   potting the cells of said honeycomb core layer surrounding said hole; and,
   bonding a second nonmetallic synthetic layer to the surface of said honeycomb core layer remote from the surface of said honeycomb core layer bonded to said one surface of said first nonmetallic synthetic layer.

2. The method claimed in claim 1 wherein said first nonmetallic synthetic layer is a graphite/epoxy layer.

3. The method claimed in claim 2 wherein said honeycomb core layer is a titanium honeycomb core layer.

4. The method claimed in claim 3 wherein said fastener is a titanium fastener.

5. The method claimed in claim 4 wherein said second nonmetallic synthetic layer is a graphite/epoxy layer.

6. The method claimed in claim 1 wherein said honeycomb core layer is a titanium honeycomb core layer.

7. The method claimed in claim 6 wherein said fastener is a titanium fastener.

8. The method claimed in claim 7 wherein said second nonmetallic synthetic layer is a graphite/epoxy layer.

9. The method claimed in claim 1 wherein said fastener is a titanium fastener.

10. The method claimed in claim 9 wherein said second nonmetallic synthetic layer is a graphite/epoxy layer.

11. The method claimed in claim 1 wherein said second nonmetallic synthetic layer is a graphite/epoxy layer.

12. The method claimed in claim 1 wherein said first and second nonmetallic synthetic layers are chosen from the group consisting of graphite/epoxy composites, graphite/polyimide composites, polybenzimidazole, polybenzoxazole, polyphenyline sulfide and polyimides.

13. The method claimed in claim 12 wherein said honeycomb core layer is formed of metal chosen from the group consisting of titanium, aluminum, copper and nickel.

14. The method claimed in claim 13 wherein said fastener is formed of a material chosen from the group consisting of titanium, aluminum, corrosion resistant steel and carbon filled epoxy.

15. The method claimed in claim 12 wherein said honeycomb core is formed of a nonmetallic material chosen from the group consisting of glass fabric reinforced phenolics, bias woven glass fabric reinforced phenolics, Nomex and polyimides.

16. The method claimed in claim 15 wherein said fastener is formed of a material chosen from the group consisting of titanium, aluminum, corrosion resistant steel and carbon filled epoxy.

17. The method claimed in claim 1 wherein said honeycomb core layer is formed of metal chosen from the group consisting of titanium, aluminum, copper and nickel.

18. The method claimed in claim 17 wherein said fastener is formed of a material chosen from the group consisting of titanium, aluminum, corrosion resistant steel and carbon filled epoxy.

19. The method claimed in claim 1 wherein said honeycomb core is formed of a nonmetallic material chosen from the group consisting of glass fabric reinforced phenolics, bias woven glass fabric reinforced phenolics, Nomex and polyimides.

20. The method claimed in claim 15 wherein said fastener is formed of a material chosen from the group consisting of titanium, aluminum, corrosion resistant steel and carbon filled epoxy.

21. The method claimed in claim 1 wherein said fastener is formed of a material chosen from the group consisting of titanium, aluminum, corrosion resistant steel and carbon filled epoxy.

22. A synthetic skin/honeycomb core sandwich structure with an embedded fastener comprising:
   a honeycomb core layer;
   at least one fastener embedded in said honeycomb core layer, said at least one fastener having a shank and an enlarged head with a flat exterior surface, said fastener embedded in said honeycomb core layer such that the flat exterior surface of said head lies co-planar with one surface of said honeycomb core and the shank of said fastener lie transverse to the plane of said honeycomb core layer;
   potting material located in the cells of said honeycomb core layer that surrounds said at least one fastener;
   a first nonmetallic synthetic layer bonded to both the surface of said honeycomb core layer that is coplanar with the flat exterior surface of the head of said at least one fastener and the flat exterior surface of the head of said at least one fastener; and,
   a second nonmetallic synthetic layer bonded to the surface of said honeycomb core layer remote from the surface to which said first nonmetallic synthetic layer is bonded.

23. A synthetic skin/honeycomb core sandwich structure claimed in claim 22 wherein said first nonmetallic synthetic layer is a graphite/epoxy layer.

24. A synthetic skin/honeycomb core sandwich structure claimed in claim 23 wherein said honeycomb core layer is a titanium honeycomb core layer.

25. A synthetic skin/honeycomb core sandwich structure claimed in claim 24 wherein said fastener is a titanium fastener.

26. A synthetic skin/honeycomb core sandwich structure claimed in claim 25 wherein said second nonmetallic synthetic layer is a graphite/epoxy layer.

27. A synthetic skin/honeycomb core sandwich structure claimed in claim 22 wherein said honeycomb core layer is a titanium honeycomb core layer.

28. A synthetic skin/honeycomb core sandwich structure claimed in claim 27 wherein said fastener is a titanium fastener.

29. A synthetic skin/honeycomb core sandwich structure claimed in claim 28 wherein said second nonmetallic synthetic layer is a graphite/epoxy layer.

30. A synthetic skin/honeycomb core sandwich structure claimed in claim 22 wherein said fastener is a titanium fastener.

31. A synthetic skin/honeycomb core sandwich structure claimed in claim 30 wherein said second nonmetallic synthetic layer is a graphite/epoxy layer.

32. A synthetic skin/honeycomb core sandwich structure claimed in claim 22 wherein said second nonmetallic synthetic layer is a graphite/epoxy later.

33. A synthetic skin/honeycomb core sandwich structure claimed in claim 22 wherein said first and second nonmetallic synthetic layers are chosen from the group consisting of graphite/epoxy composites, graphite/polyimide composites, polybenzimidazole, polybenzoxazole, polyphenyline sulfide and polyimides.

34. A synthetic skin/honeycomb core sandwich structure claimed in claim 33 wherein said honeycomb core layer is formed of metal chosen from the group consisting of titanium, aluminum, copper and nickel.

35. A synthetic skin/honeycomb core sandwich structure claimed in claim 34 wherein said fastener is formed of a material chosen from the group consisting of titanium, aluminum, corrosion resistant steel and carbon filled epoxy.

36. A synthetic skin/honeycomb core sandwich structure claimed in claim 33 wherein said honeycomb core is formed of a nonmetallic material chosen from the group consisting of glass fabric reinforced phenolics, bias woven glass fabric reinforced phenolics, Nomex and polyimides.

37. A synthetic skin/honeycomb core sandwich structure claimed in claim 36 wherein said fastener is formed of a material chosen from the group consisting of titanium, aluminum, corrosion resistant steel and carbon filled epoxy.

38. A synthetic skin/honeycomb core sandwich structure claimed in claim 22 wherein said honeycomb core layer is formed of metal chosen from the group consisting of titanium, aluminum, copper and nickel.

39. A synthetic skin/honeycomb core sandwich structure claimed in claim 38 wherein said fastener is formed of a material chosen from the group consisting of titanium, aluminum, corrosion resistant steel and carbon filled epoxy.

40. A synthetic skin/honeycomb core sandwich structure claimed in claim 22 wherein said honeycomb core is formed of a nonmetallic material chosen from the group consisting of glass fabric reinforced phenolics, bias woven glass fabric reinforced phenolics, Nomex and polyimides.

41. A synthetic skin/honeycomb core sandwich structure claimed in claim 40 wherein said fastener is formed of a material chosen from the group consisting of titanium, aluminum, corrosion resistant steel and carbon filled epoxy.

42. A synthetic skin/honeycomb core sandwich structure claimed in claim 22 wherein said fastener is formed of a material chosen from the group consisting of titanium, aluminum, corrosion resistant steel and carbon filled epoxy.

* * * * *